United States Patent [19]
Cocke et al.

[11] 3,800,291
[45] Mar. 26, 1974

[54] DATA PROCESSING SYSTEM MEMORY RELOCATION APPARATUS AND METHOD

[75] Inventors: John Cocke, Mount Kisco, N.Y.; David R. Helman, Saratoga, Calif.

[73] Assignee: International Business Machines Corporation, Armonk, N.Y.

[22] Filed: Sept. 21, 1972

[21] Appl. No.: 291,103

[52] U.S. Cl. .................................... 340/172.5
[51] Int. Cl. .................................... G06f 9/20
[58] Field of Search .................................... 340/172.5

[56] References Cited

UNITED STATES PATENTS

| | | | |
|---|---|---|---|
| 3,387,278 | 6/1968 | Pasternak | 340/172.5 |
| 3,570,006 | 3/1971 | Hoff et al. | 340/172.5 |

OTHER PUBLICATIONS

Flores, I., Datamation, 1967, Vol. 13, No. 9, p. 41–48.
Wegner, P., Proceedings of 22nd Nat'l Conference of Assoc. for Computing Machinery, 1967, p. 135–150.
Cohen, J., Communications of the ACM, Vol. 10, No. 2, Feb. 1967, p. 82–86.
Chu, Y., IEEE Transactions on Electronic Computers, Vol. EC–14, No. 3, 1965, p. 417–422.

*Primary Examiner*—Paul J. Henon
*Assistant Examiner*—Michael Sachs
*Attorney, Agent, or Firm*—James E. Murray; John H. Holcombe

[57] ABSTRACT

A data processing system having a virtual memory comprising pages which are relocatable between various levels of physical storage. The virtual memory primarily contains information comprising instructions arranged sequentially so that once a virtual address has been translated to the physical address in high speed memory, the physical address can be incremented to fetch the next sequential information. Branch instructions may branch to the address of information on the same or another page. The branch instruction includes an indicator as to whether the branch address is a physical address on the same or another page or a virtual address on another page. Only when a virtual address is encountered is the relocation table employed to convert the virtual address to a physical address and to load the page if necessary.

9 Claims, 2 Drawing Figures

DATA PROCESSING SYSTEM MEMORY RELOCATION APPARATUS AND METHOD

BACKGROUND OF THE INVENTION

1. Field of the Invention

The invention relates to digital data processing apparatus and methods and more particularly to such apparatus and methods as relates to storage and storage addressing.

2. Description of the Prior Art

Over the past several years, digital data processing machines have become progressively more complex. This is the result of a continuing effort to provide more functions without substantial increases in cost.

The heart of most digital data processing machines is the control element. Many digital data processing machines employ a centralized control storage made up of large numbers of micro instructions. A macro instruction, the type often employed by programmers in writing a program, requires a sequence of micro instructions to operate the various machine circuits to accomplish the macro instruction. Micro instructions may therefore be viewed as gating patterns which operate the various circuits of the digital data processing machine in sequences in accordance with macro instructions to allow execution of a computer program.

Originally, micro instructions were fixed in hardware, so were called "read-only" instructions. With the advent of U.S. Pat. No. 3,478,322, filed May 23, 1967, and assigned to the assignee of the present invention, electronically changeable control storage came into use.

Electronically changeable control storage has proved valuable in allowing the microprogram (an accumulation of micro instructions) to be easily updated. As a general rule, computers remain in use several years after their manufacture. During this period, advantageous changes to microprogram sequences are often envisioned. With an electronically changeable control store, the microprogram may easily be updated to incorporate these changes by loading a new microprogram into the store.

The electronically changeable control store is an expensive type of storage. Further, only a small portion of the control store is in use at any one time. Therefore, it would be of substantial advantage to store the unused portion of the microprogram in a less costly type of storage until needed for use.

The virtual memory relocation of program information or data between various levels of storage has been accomplished. Addressing is by virtual address to a large virtual memory. A translation is then made to the actual address of the desired information and the information is brought into high speed memory if it is not already there. The programming to accomplish the translation of addresses between virtual and real to be able to access the desired information or data is extensive. To adapt this type of translation and relocation technique to each micro instruction that is addressed would cause a significant increase in the time required for micro instruction operation of the data processing machine. A significant reduction in the efficiency of the data processing machine would necessarily follow.

SUMMARY OF THE INVENTION

It is therefore an object of the present invention to provide virtual memory relocation which is useable for data processing control storage without significant reduction of efficiency thereof.

Briefly, the invention comprises apparatus and method for relocation of data processing control storage. The control storage is divided into a plurality of pages distributed between various levels of storage means. Micro instructions arranged in sequence are accessed sequentially by physical address. Branch instructions, if successful, may branch to another micro instruction on the same or a different page. If the branch is to the same page or to a page known to be resident in control memory, the branch address is the physical address and an indicator thereof is provided. If the branch is to another page not known to be resident, the branch address is a virtual address, and an indicator thereof is provided. Addressing means responds to a non-branch condition by incrementing the physical address, responds to the physical address indicator by addressing the physical branch address, and responds to the virtual indicator by supplying the virtual branch address to address translation means for translation to a physical address of a currently resident page or to an address to operate a page fault relocation routine to page in the desired page.

DESCRIPTION OF THE PREFERRED EMBODIMENT

Figure 1:
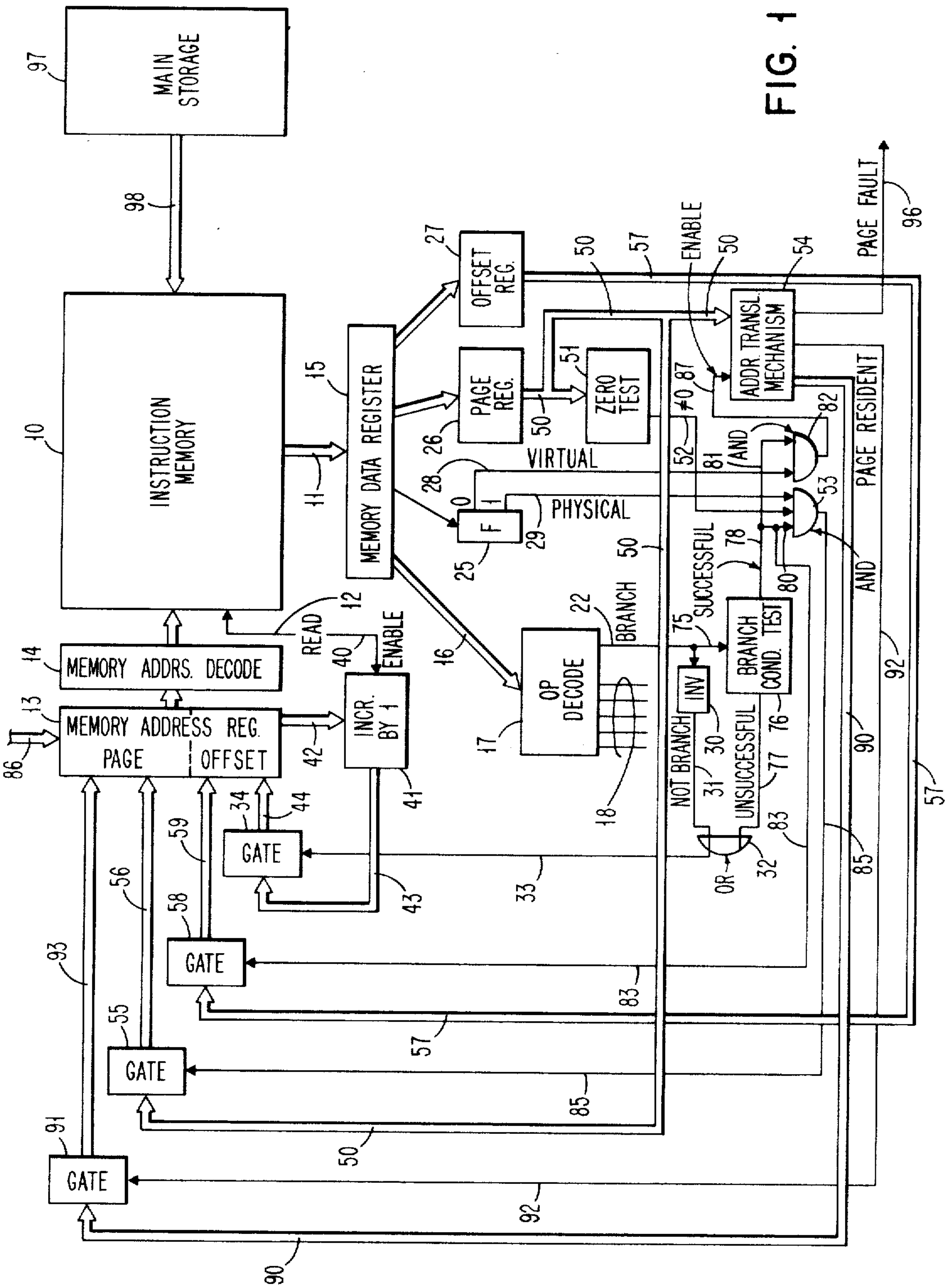
FIG. 1 comprises a block diagram illustration of apparatus arranged in accordance with the present invention.

The structure of the present invention is illustrated with respect to FIG. 1. The memory 10 may comprise any memory or electronically changeable control storage. As shown in the system of FIG. 1, the memory is employed for the storage of machine microinstructions. Although not quite so advantageous as in the illustrated system, memory 10 may instead be employed for the storage of program instructions. In the example where the memory comprises a control memory, the control memory may be implemented in a central processing unit or in an input/output control unit.

In either instance, the system is in data processing apparatus similar to that of our co-pending patent application Ser. No. 291,102, filed Sept. 21, 1972 and assigned in common with the present application.

As stated previously, only a small portion of the entire complex of instructions comprising the control store is in use at any one time. So as to reduce the expanse of a memory 10 by reduction in size, it is desirable to store the unused portion of the instructions in a less costly type of storage until needed for use. Hence, the control storage is divided into a plurality of pages distributed between memory 10 and a less costly type of storage.

Any instruction fetched from memory 10 is supplied at the output 11 thereof. A fetch from the memory 10 is determined by an internal clock, which is standard to data processing apparatus. An output line 12 from the clock drives the memory 10 once each memory cycle unless interrupted. The physical address of the desired instruction in the memory 10 is contained in a memory address register 13. As illustrated, this physical address comprises two parts, a page number and offset within that page.

The output of the memory address register 13 is supplied to memory address decoding circuitry 14. The memory address decoding circuitry selects an instruction location in memory 10 and, upon the clock supplying a signal on line 12, the accessing of the desired instruction is initiated. Subsequently, the memory 10 supplies the desired instruction on output 11 to a memory data register 15.

Micro instructions may take two forms. They may simply comprise a series of binary bits, each of which directly operates a gate or control circuit. In another form, they may resemble program or macro instructions by including an operator. An operator comprises a small number of binary bits which are decodable characters. The bits are decoded by separate circuitry which in turn operates pluralities of gating and control circuits.

Assuming the latter type of micro instruction, the operator occupies the same bit positions in each instruction. Therefore, the operator comprises specified bit positions in memory data register 15. These bit positions are connected via lines 16 to op decode circuitry 17. The op decode circuitry 17 is a binary to 1-out-of-N type of decoder. Thus, the binary information representing an operator received on line 16 is decoded by op decode circuitry 17 and, as the result of the decoding, a signal is supplied on one of the output lines 18 or 22. In the example shown, lines 18 represent any instruction except the branch instruction, and line 22 represents only the branch instruction operator. The selected line 18 is connected to each of the gate and control circuits to be operated by the micro instruction.

Besides containing the data representing an operator, memory data register 15 also contains additional data. If the instruction is a branch instruction, this data includes a branch address, as will be explained. If the operator is other than a branch, the memory data register additionally will contain one or more operands.

The bit positions of the memory data register 15 comprising the branch address are connected to circuits 25, 26 and 27. Gating lines may be supplied from branch operand line 22 to each of the circuits 25, 26 and 27 so that the circuits are operable only when the information in the appropriate bit positions of the memory data register 15 comprises the branch address. In the illustrated implementation, all of the outputs from those circuits are controlled by gates derived from line 22. Therefore, information from those circuits will be effective only during execution of a branch instruction so that the gating of the circuits is unnecessary.

One bit position of the branch address is connected to flag circuit 25. This circuit may comprise a single position register for storing an indicator bit. In the instant example, it is assumed that if this bit is a 0, the remainder of the branch address is a virtual address. If the bit is a 1, this indicates that the remainder of the branch address is a physical address. Two outputs are provided from a register 25, line 28 indicating that the content of the register is a 0, and line 29 indicating that the content of the register is a 1.

A number of bit positions of the branch address comprises the physical or virtual page number and is supplied to page register 26. The remainder of the branch address comprises the offset within that page of the addressed instruction and is supplied to offset register 27.

So long as no branch instruction is decoded, no signal will appear on line 22 from op decode circuitry 17. An inverter 30 therefore supplies a signal on line 31 to OR circuit 32. This circuit supplies a signal on line 33 to operate gate circuit 34.

At the time that the clock provides the signal on line 12 which initiates accessing the instruction in memory 10, it also supplies a signal on line 40 to incrementing circuit 41. The offset portion of the address of memory address register 13 is continuously supplied on cable 42 to circuit 41. When the enabling signal appears on line 40, circuit 41 proceeds to increment the address received on cable 42 by 1. When so incremented, the new address is supplied on cable 43 to gate circuit 34. Thus, so long as the instruction is not a branch, gate circuit 34 will be enabled so the incremented offset portion of the address is supplied on cable 44 to the offset portion of the memory address register 13. The total incremented address is then supplied to memory address decode circuitry 14, which decodes the address for use by memory 10. Thus, when a clock again supplies a signal on line 12, the memory 10 initiates access of the next sequential instruction.

It is this point that is important to the present invention. It has been recognized here that an instruction memory 10 contains sequential series of instructions. Thus, as long as instructions are fetched sequentially, there is no need to translate the addresses from virtial to physical on every access. Rather, the physical address can be incremented in order to fetch the next sequential instruction. The addresses need be translated only when crossing a page boundary or when branching to another page.

Referring again to FIG. 1, the output of page register 26 is connected, via cable 50, to zero test circuit 51. As discussed, page register 26 includes the physical or virtual page number contained in the branch address of the branch instruction. Zero test circuit 51 tests the contents of page register for 0. The use of this circuit allows the branch micro-instruction to alternatively contain all zeros as the page number for a physical address, thereby indicating that the page of the branch address is the same as the page of the branch instruction. Zero test circuit 51 supplies a signal on line 52 to AND circuit 53 so long as a non-zero page number is contained in page register 26. Upon no page number being present, zero test circuit 51 ceases to supply signal on line 52. Therefore, AND circuit 53 will be employed to block the page number from being transmitted to the memory address register 13, as will be explained hereinafter.

The output of page register 26 is also supplied on cable 50 to address translation mechanism 54 for translation from virtual to physical as will also be explained hereinafter.

The output of page register 26 and cable 50 is also supplied to gate circuit 55. The gate circuit 55 controls transmission of the page number from cable 50, via cable 56 to the page portion of memory address portion 13.

Offset register 27 contains the offset portion of the branch address from the branch instruction in memory data register 15. The output of offset register 27 is supplied via cable 57 to gate circuit 58. Gate circuit 58 controls the transmission of the offset portion of the branch address, via cable 59, to the offset portion of memory address register 13.

The branch signal supplied from op decode circuitry 17 on line 22 is also supplied to input 75 branch condition test logic 76. This logic is well known to those skilled in the computer arts and simply tests whether the conditions stated in the branch instruction are true or untrue. Upon completion of the test, test logic 76 will indicate the results of that test by supplying a signal on either line 77 or line 78. A signal on line 77 indicates that the branch condition is found to be untrue and therefore no branch is to be made. This is called an unsuccessful test. On the other hand, a signal on line 78 indicates that the branch condition was found to be true and indicates that the branch is to be made. This is called a successful test.

If no branch is to be made, the series of instructions is to continue to be executed sequentially. This is the same as though the instruction had not been a branch. Therefore, line 77 is connected to OR circuit 32 in the same manner as line 31 which indicates the non-branch instructions. The signal on line 77 is transmitted by OR circuit 32 on line 33 to gate circuit 34. The gate circuit allows the offset address as incremented by circuit 41 from cable 43 via cable 44 to the offset portion of the memory address register 13. This comprises the address of the next sequential instruction which is provided to memory address decode circuitry 14 for accessing that instruction at the next clock cycle 12.

If the branch condition test logic 76 indicates that the branch is successful, the signal on line 78 is supplied to input 80 of AND circuit 53, to input 81 of AND circuit 82, and on line 83 to the enabling input of gate circuit 58. The signal on line 78 therefore is indicating that the branch address contained in registers 25, 26 and 27 will be employed to access the next instruction from memory 10.

The signal on line 78 is immediately transmitted on line 83 to gate circuit 58 to thereby automatically transmit the page offset from register 27 on cable 57 to the offset portion of memory address register 13.

AND circuit 53 tests the flag stored in register 25 to determine whether it indicates the page address is a physical address by a signal on line 29. AND circuit 53 also tests whether the page number present at page register 26 of the memory address is equal to 0. If it is equal to 0, no signal is supplied thereto on line 52 and no signal is transmitted by AND circuit 53 on line 85 to the enabling input of gate circuit 55. Therefore, the all-zeros page number from register 26 will be blocked from the page portion of the memory address register 13. As the result, the page number previously contained in register 13 remains unchanged and is transmitted to the memory address decoding circuitry 14 for decoding to initiate the accessing of the instruction at the branch address upon the next clock cycle as indicated by the signal on line 12 to memory 10.

If the page number in register 26 is non-zero, zero test circuitry 51 will supply a signal on line 52. If the flag stored in register 25 indicates that the page is a physical page by the supplying of a signal on line 29, AND circuit 53 will be operated by the conjunction of those two signals together with the signal at input 80 thereof. AND circuit 53 thereupon provides a signal on line 85 to the enabling input of gate circuit 55. The gate circuit then gates the contents of page register 26 as appearing on cable 50 to the page portion of the memory address register 13. This page number may or may not be the same page number as that previously present in the same portion of the memory address register. The resultant physical branch address is then supplied by the register to memory address decoding circuitry 14 for initiating the instruction at the branch address in memory 10.

AND circuit 82 simply tests whether the flag stored in register 25 indicates that the page number stored in register 26 is a virtual page number. If the flag indicates the page is virtual, register 25 supplies a signal on line 28 to the AND circuit 82. The enabling input of test circuit 76 from line 78 is applied to input 81 of the AND circuit. Upon the conjunction of these signals operating AND circuit 82, a signal is supplied on line 86 to the enabling input of address translation mechanism 54.

The address translation mechanism comprises a standard table lookup function wherein the physical addresses of pages are laid out in sequence in accordance with virtual page number. Thus, the table position corresponding to the virtual page number supplied on cable 50 is accessed by the address translation mechanism 54. If the page is currently resident, as indicated by a flag in the look up table, then the physical address provided at that access position refers to memory 10. Therefore, address translation mechanism 54 supplies the physical page address on cable 90 to gate circuit 91 and also supplies a signal on line 92 to enable gate circuit 91 to transmit the page number on cable 93 to the page portion of memory address register 13.

If the flag provided by the address translation mechanism indicates that the page is not currently resident in memory 10, the mechanism supplies a page fault interrupt signal on line 96. This signal invokes a specified series of micro instructions from memory 10 which causes the desired page to be moved from main storage 97 to instruction memory 10 via cable 98, overlaying a page in the memory 10. As opposed to most present virtual memory systems, there is no need with an instruction memory 10 to page out the page that is being overlaid. This is because an instruction memory does not alter the instructions contained therein for future use. Therefore, the pages contained in memory 10 may simply be duplicates of desired ones of the pages contained in main storage 97. The micro instructions thereupon supply the physical address in main storage 97 of the overlaid page to the table in address translation mechanism 54 and supply the physical address in instruction memory 10 of the page brought into memory to the address translation mechanism.

Upon receipt of the new physical address of the page, address translation mechanism 54 supplies the physical address on cable 90 to gate circuit 55 and supplies a signal on line 92 to the gate circuit to transfer the page address via cable 56 to the page portion of memory address register 13. That address is then decoded by memory address decode circuitry 14 and the instruction at the resultant branch address is accessed on the next cycle initiated by the signal on line 12.

The specific character of the address translation mechanism 54, the paging methodology, main storage 97 and the connections therebetween form no part of the present invention and therefore are not described in detail. These elements are well-known to the practitioners in the art in either software or hardware form. Examples of such a system are the IBM System 370/Model 67 with relocate system, the recently announced IBM System 370 virtual memory system and the paging system of copending patent application Ser. No. 207,508, "Memory Size Independent Data Processing System and Method", C. D. Coleman, filed Dec. 13, 1971.

Figure 2:
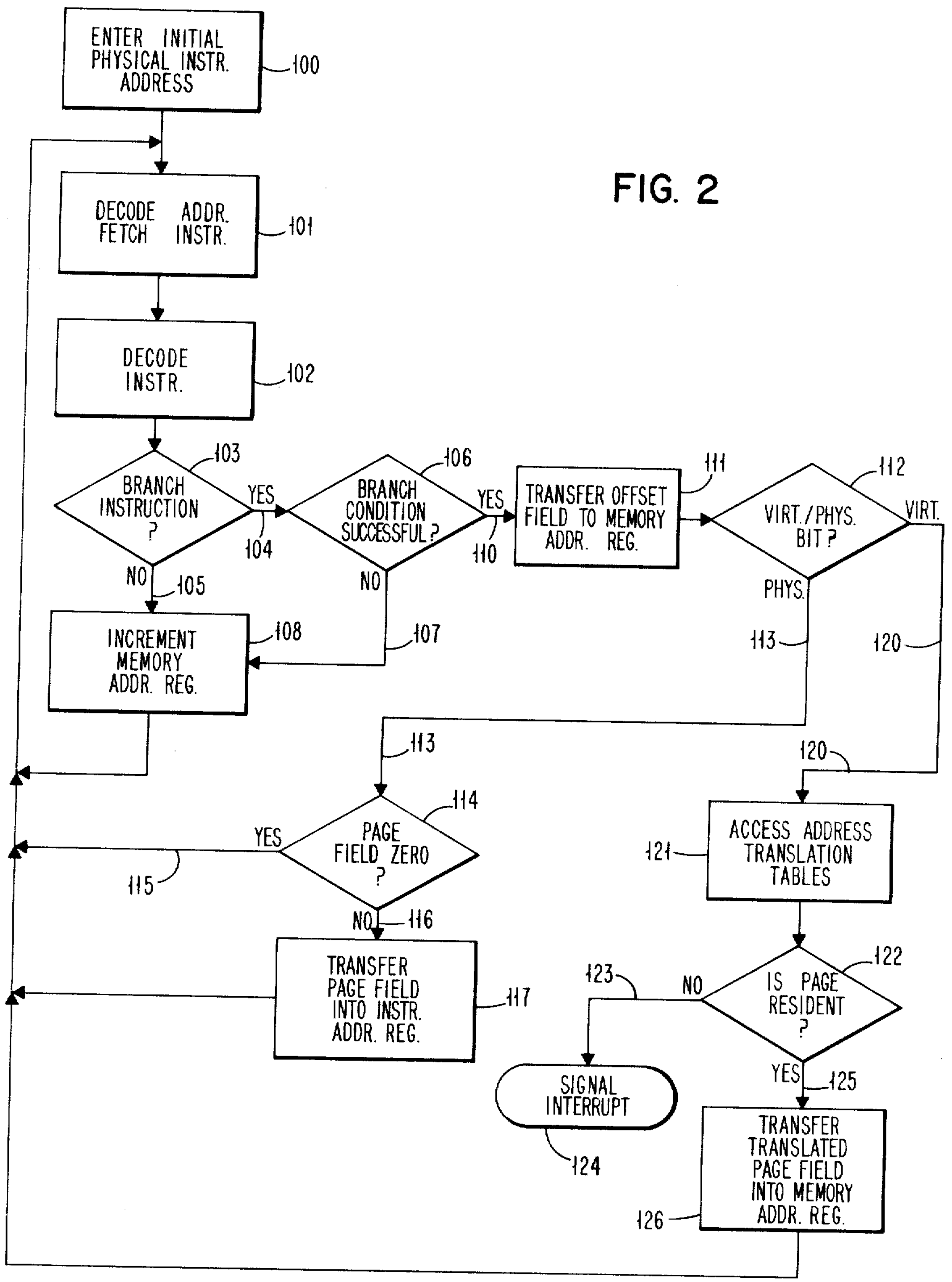
FIG. 2 comprises a flow chart illustrating operation of the apparatus of FIG. 1 in accordance with the method of the present invention.

FIG. 2 comprises a flow chart illustrating operation of the apparatus of FIG. 1 in accordance with the method of the present invention. Entry to the process is illustrated by step 100. This may comprise entry of an initial address of a first instruction at input 86 to memory address register 13. Step 101 represents the decoding of the physical memory address decode circuitry 14 and the initiation of the fetch of the addressed instruction by the supplying of the decoded memory address to memory 10 and the supplying of the clock pulse to the memory on line 12. Step 102 represents the presentation by memory 10 of the fetched instruction to memory data register 15 and the decoding of the instruction operator by operator decode circuitry 17. Step 103 represents the outputs obtained from operator decode circuitry 17. If the instruction is a branch, decoding circuitry 17 supplies an output on line 22. This represents path 104 from step 103. Path 105 indicates that no signal is supplied on line 22 and represents the signal supplied by inverter 30 on line 31.

Path 104 leads to step 106 represented by the supplying of the branch signal on line 22 to input 75 of branch condition test circuitry 76. If the branch condition circuitry indicates that the test is unsuccessful, a signal is supplied on line 77. This is indicated in FIG. 2 by path 107. Both path 107 from step 106 and path 105 from step 103 lead to step 108. Step 108 increments the memory address register 13. This represents a signal on line 31 or line 77 which is transmitted by OR circuit 32 over line 33 to thereby enable gate 34. Enabling the gate allows the address incremented by incrementing circuit 41 to be transmitted to the offset portion of the memory address register 13. Step 108 leads to step 101 for decoding the incremented address and fetching the next instruction from memory 10.

Upon step 106 indicating that the branch condition has been successful, path 110 is indicated which leads to step 111. Step 111 comprises the transfer of the offset field to the memory address register 13. Referring to FIG. 1, this comprises the successful signal from branch condition test circuitry 76 on line 78 which is transmitted via line 83 to enable the gate circuit 58. This causes the offset field from offset register 27 to be transmitted via cables 58 and 59 to the offset portion of the memory address register 13.

Upon completion of step 111, step 112 tests whether the flag bit indicates that the branch address is a physical or virtual address. Path 113 indicates that the flag register 25 has provided a signal on line 29 to indicate that the branch address is a physical address. Path 113 leads to step 114 which tests whether the page field contained in register 26 is 0. This test is conducted by zero test circuitry 51 in FIG. 1. Path 115 indicates that the page field is 0 and represents the lack of any signal on line 52 from the zero test circuit 51. Thus, AND circuit 53 is blocked and no page number is transmitted to the memory address register 13. Therefore, path 115 leads to step 101 which simply decodes the instruction addressed by the preexisting physical page number and the new offset address provided by the branch instruction in memory address register 13.

Path 116 from step 114 indicates that the page field is non-zero as represented by a signal appearing from circuit 51 on line 52. The conjunction of signals on lines 80, 29 and 52 at AND circuit 53 operates the AND circuit to supply a signal on line 85. This is represented by step 117 which comprises the enabling of gate 55 to transmit the physical page address from register 26 via cables 50 and 56 to the page portion of memory address register 13. The page having been transferred, step 117 leads to step 101 to decode the new physical address and fetch the addressed instruction.

Path 120 from step 112 in FIG. 2 is the result of the flag stored in register 25 indicating that the branch address is a virtual address. This corresponds to a signal on line 28 in conjunction with the successful branch condition test signal on line 81 to AND circuit 82. Path 120 therefore leads to step 121 which corresponds to the signal on line 87 enabling the address translation mechanism 54. Step 121 accesses the address translation tables and step 122 tests whether the translated physical address comprises a page in memory 10 or a page in main storage 97. If the page is not in memory 10, the address translation mechanism 54 provides a signal on line 96 comprising a page fault interrupt signal. This is represented by path 123 from step 122. Path 123 leads to step 124 which comprises an entry to the paging methodology not a part of the present invention.

Path 125 corresponds to step 122 indicating that the desired page is located in memory 10. This comprises a signal on line 92 from the address translation mechanism 54. This path leads to step 126 which comprises the transfer of the translated page field into memory address register 13. This is accomplished in FIG. 1 by a signal on line 92 enabling gate 91 to transmit the translated page address from the address translation mechanism via cables 90 and 93 to the page portion of memory address register 13. Step 126 leads to step 101 for decoding and fetching the instruction at the branch address.

In summary, an address translation is first performed when the program is entered creating a physical address for instruction fetching. This address is supplied at input 86 to the memory address register 13. The physical address is incremented sequentially by circuit 41 for subsequent instruction fetching. When a branch instruction is encountered as indicated by a signal on line 22 and the branch conditions are met as indicated by circuitry 76, the virtual/physical bit from the branch instruction is examined. If the bit is sent to "physical", no address translation of the branch address is performed.

The same logic is employed when the program crosses page boundaries by making the last instruction in a page a branch instruction to whatever page has to be entered next.

A physical branch address can be assembled into a program whenever it can be guaranteed that the page to be branched to will be resident in the memory. This will occur either for a branch within the current page itself, or a branch to another page which has either been made permanently resident by the control program or has been temporarily fixed in a physical address which has been assembled into the branch instruction as a physical address.

When the virtual/physical bit is examined and found to be in the "physical" state, the page field of the branch address in register 26 is tested. If it is all zeros, it indicates that the branch is internal to the current page, thus no address translation is necessary. The new instruction address in memory address register 13 is created by retaining the old physical page address and substituting the offset from the branch address at register 27 for the old offset in the memory address register. If the page field in the branch address is other than all zeros, it is still treated as a physical address and the entire branch address from registers 26 and 27 is transferred into the memory address register 13.

Only when the virtual/physical bit is set to "virtual" is the address translation mechanism invoked. The virtual page address is translated into a physical page address, which is transferred into the page portion of the memory address register. At the same time, the offset field from the branch instruction in register 27 is transferred into the offset portion of the instruction address register. Due to the special meaning assigned to a field of all zeros in the branch address, no direct branch to the physical page zero can take place. Given the specific example that an all-zero field indicates the present page, no code which may have to be branched to directly should reside in the physical page 0. This space in memory can be used to contain the address translation tables employed by the address translation mechanism 54 and by step 121 in FIG. 2.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data processing apparatus including memory addressing means, memory means having both physical and virtual addressing locations for storing instructions and supplying addressed instructions at an output thereof in response to said memory addressing means, and branch condition test means for executing a branch instruction appearing at said memory output to determine whether the branch condition has been met and to supply a signal upon said condition having been met, the improvement thereto comprising:

said branch instruction including a branch address and an indicator as to whether said branch address is physical or virtual;

incrementing means responsive to each instruction supplied at said memory output not causing said branch condition test means to generate said signal, for incrementing the current physical address in said memory addressing means by a predetermined amount;

first means responsive to said signal and the physical indication by said indicator for supplying said branch address to said memory addressing means; and second means responsive to said signal and the virtual indication by said indicator for signalling that said branch address requires translation.

2. The apparatus of Claim 1 wherein:

said branch condition test means additionally is arranged to supply a second signal upon said condition not having been met; and said incrementing means is responsive to each non-branch instruction supplied at said memory output and is responsive to said second signal for incrementing the last address of said memory addressing means by a predetermined amount and supplying said incremented physical address to said memory addressing means.

3. The apparatus of Claim 1 wherein:

said branch address includes a page portion and an offset portion;

offset means is responsive to said signal from said branch condition test means to supply said offset portion of said branch address to said memory address means;

said first means is responsive to said signal and the physical indication by said indicator for supplying said page portion of said branch address to said memory address means; and said second means is responsive to said signal and the virtual indication by said indicator for signalling that the page portion of said branch address requires translation.

4. The apparatus of Claim 3 wherein:

said incrementing means, said offset means and said first means each includes gating means.

5. Data processing memory relocation apparatus comprising:

memory addressing means for providing addressing signals; instruction memory means having both physical and virtual addressing locations for storing instructions, including branch instructions having a branch address and an indicator whether said branch address is physical or virtual, and supplying addressed instructions at an output thereof in response to said addressing signal;

branch condition test means for testing a branch instruction appearing at said memory output to determine whether the branch condition has been met and to supply a signal upon said condition having been met;

incrementing means responsive to each instruction portion of said memory output that does not cause said branch condition test means to generate said signal, for incrementing the current physical address in said memory addressing means by an address; and first means responsive to said signal and the physical indication by said indicator for supplying said branch address to said memory addressing means; and second means responsive to said signal and the virtual indication by said indicator for providing an address translation request signal.

6. The apparatus of Claim 5 wherein:

said branch condition test means additionally is arranged to supply a second signal upon said condition not having been met; and said incrementing means is responsive to each non-branch instruction supplied at said memory output and is responsive to said second signal for incrementing the last address of said memory addressing means by a predetermined amount and supplying said incremented physical address to said memory addressing means.

7. The apparatus of Claim 5 wherein:

each said branch address stored by said instruction memory means includes a page portion and an offset portion;

offset means is provided which is responsive to said signal from said branch condition test means to supply said offset portion of said branch address to said memory address means;

said first means is responsive to said signal and the physical indication by said indicator for supplying said page portion of said branch address to said memory address means; and said second means is responsive to said signal and the virtual indication by said indicator for signalling that the page portion of said branch address requires translation.

8. The apparatus of Claim 3 wherein:

said incrementing means, said offset means, said first means and said second means each includes gating means.

9. A method for operating a data processing apparatus in response to instructions, including branch instructions having a branch address and an indicator whether said branch address is physical or virtual, said data processing apparatus including memory addressing means, memory means having both physical and virtual addressing locations for storing instructions and supplying instructions addressed by said memory addressing means, and branch condition test means for executing branch instructions supplied thereto, comprising the steps of:

responding to said instructions supplied at the output of said memory means to determine whether said instruction is a branch instruction;

testing a branch instruction when one occurs to determine whether the branch condition has been met;

incrementing the current physical address when said instruction is other than a branch instruction or if it is a branch instruction and the testing of said branch instruction determines said branch condition has not been met;

testing said indicator when testing of a branch instruction determines a branch condition has been met;

supplying the branch address to said memory address means when in response to a physical indication from said tested indicator; and signaling for translation of said branch address in response to a virtual indication from said tested indicator.

* * * * *